3,265,670
CURING ETHYLENE-PROPYLENE COPOLYMERS
Charles E. Scott, Drexel Hill, Pa., assignor to Avisun Corporation, Philadelphia, Pa., a corporation of Delaware
No Drawing. Filed Aug. 1, 1961, Ser. No. 128,369
2 Claims. (Cl. 260—79)

This invention relates to improvements in the processing of raw ethylene-propylene copolymers, and more particularly to vulcanization of the copolymers with novel curing formulations.

The copolymerization of ethylene and propylene in the presence of a coordination complex catalyst to yield a product resembling unvulcanized rubber has been heretofore described, particularly in Belgian Patent 553,655. Crosslinking of the polymer by curatives such as peroxides to yield elastomers is also known to the art, and has been described in Belgian Patent 563,834. One of the drawbacks of the elastomers cured with peroxides alone is that they do not have a particularly high tensile strength, even when reinforced with carbon black. It has been found possible to increase this tensile strength to a value approaching that of synthetic and natural rubbers by adding a small amount of sulfur to the formulation prior to curing. During curing, however, the peroxide apparently reacts with the sulfur to form products having a most unpleasant odor, and this odor is sufficiently penetrating to prevent the use of copolymer elastomers in many applications.

It is an object of this invention to provide a curable composition comprising ethylene-propylene copolymer which, after curing, will yield a finished product having increased tensile modulus and tear strength over the product obtained when curing with peroxides alone, and which is free of the very objectionable odor resulting from the use of sulfur in the cure.

I have now found that the foregoing object may be achieved by incorporating into the raw copolymer, along with the peroxide, from 0.2 to 2 parts per 100 parts of copolymer of an alkali metal salt of an anthraquinone disulfonic acid. The mechanism by which these salts work is not fully understood, but it is believed that they act as free radical traps in a manner analogous to sulfur. Surprisingly, the alkali metal salts of anthraquinone monosulfonic acids and anthraquinone itself are not effective as promoters for the cure. The formulation, in addition to the salt, should contain from about 2 to about 5 parts of a peroxide such as dicumyl peroxide or benzoyl peroxide. Optionally, from about 25 to about 100 parts of carbon black may be added to the copolymer, together with other compounding agents such as zinc oxide, rubber processing oils, or stearic acid, etc.

In order that those skilled in the art may more fully understand the nature of my invention and the manner of carrying it out, the following examples are given.

EXAMPLE I 100 parts by weight of ethylene-propylene copolymer were mixed on a rubber mill with 50 parts of Philblack O carbon black, 1 part of zinc oxide, 4 parts of dicumyl peroxide, and 0.25 part of the dipotassium salt of 1,8-anthraquinone disulfonic acid. The mixture was then extruded and one part was cured for 45 minutes at 300° F. and another part was cured for 60 minutes at the same temperature. The cured polymer was free of any mercaptan-like odor.

EXAMPLES II–IV

The procedure of Example I was followed except that 0.5 part, 0.75 part and 1.0 part of the dipotassium salt of 1,8-anthraquinone disulfonic acid were used instead of 0.25 part.

Physical properties of the elastomers made in Examples I through IV are set forth in the following table.

Table I

|  | Minutes | Control | Ex. I | Ex. II | Ex. III | Ex. IV |
|---|---|---|---|---|---|---|
| Tensile strength, p.s.i. | 45 | 1,500 | 2,000 | 1,925 | 1,975 | 1,975 |
|  | 60 | 1,475 | 1,850 | 1,900 | 1,725 | 1,800 |
| 200% modulus, p.s.i. | 45 | 525 | 900 | 900 | 975 | 825 |
|  | 60 | 550 | 950 | 1,100 | 975 | 950 |
| 300% modulus, p.s.i. | 45 | 1,125 | 1,775 | 1,750 | 1,700 | 1,700 |
|  | 60 | 1,150 | 1,825 | -------- | -------- | 1,700 |
| Percent elongation | 45 | 370 | 340 | 325 | 325 | 330 |
|  | 60 | 365 | 295 | 290 | 290 | 310 |
| Shore A hardness | 45 | 56 | 60 | 60 | 60 | 59 |
|  | 60 | 57 | 62 | 62 | 61 | 60 |
| Percent permanent set | 45 | 13 | 6 | 13 | 6 | 13 |
|  | 60 | 13 | 6 | 6 | 6 | 6 |
| Tear strength, #/in. | 45 | 76 | 159 | 93 | 148 | 125 |
|  | 60 | 83 | 114 | 157 | 111 | 150 |

In the control, 100 parts of the copolymer were mixed with 50 parts of carbon black, 1 part of zinc oxide, and 4 parts of dicumyl peroxide as the sole compounding agents.

It will be observed from the foregoing data that inclusion of the salt of anthraquinone disulfonic acid results in greatly improved tensile strength and tear strength, and that the permanent set is substantially reduced in most instances. In contrast to the foregoing, if the salt of anthraquinone disulfonic acid is replaced by the sodium salt of anthraquinone monosulfonic acid, the tensile strength of the cured product is reduced by as much as 375 p.s.i., and the permanent set is increased to as much as 25%.

The invention claimed is:

1. A curable composition comprising an ethylene-propylene copolymer, an organic peroxide, and from 0.2 to 2.0 parts per hundred by weight, based on the copolymer, of an alkali metal disalt of anthraquinone disulfonic acid as the sole sulfur-containing ingredient of the composition.

2. The composition of claim 1 in which the disalt is 1,8-anthraquinone disulfonic acid dipotassium salt.

References Cited by the Examiner
UNITED STATES PATENTS
2,826,570 3/1958 Ivett _____ 260—94.9
2,999,869 9/1961 Donaldson _____ 260—370
3,047,552 7/1962 Reynolds et al. _____ 260—88.2

LEON J. BERCOVITZ, *Primary Examiner.*

JOSEPH L. SCHOFER, *Examiner.*

R. A. BURROUGHS, M. P. HENDRICKSON, M. I. MARQUIS, *Assistant Examiners.*